July 7, 1959          W. R. BELL          2,893,221

SNAP-ON COUPLING FOR A FLEXIBLE SHAFT

Filed July 1, 1955

INVENTOR
WILLIAM R. BELL

BY *John C. Black*

ATTORNEY

United States Patent Office 2,893,221
Patented July 7, 1959

2,893,221

SNAP-ON COUPLING FOR A FLEXIBLE SHAFT

William R. Bell, Skokie, Ill., assignor to Stewart-Warner Corporation, Chicago, Ill., a corporation of Virginia Application July 1, 1955, Serial No. 519,466

5 Claims. (Cl. 64—4)

This invention relates to couplings and more particularly to a coupling means for flexible shafts.

It will be understood that the invention can be utilized for most flexible shaft applications; however, it will be assumed only for ease of description that the invention is used for automotive speedometer applications.

It has been the practice in the art to secure flexible shafting to a threaded sleeve on the speedometer and to a threaded stud on the transmission casing of a vehicle by means of metal coupling nuts. It is obvious that an appreciable amount of time is necessary to make connections by means of said couplings.

It is now proposed by the inventor to provide a somewhat firm rubber coupling element suitably attached to each end of the flexible shaft casing and adapted to snap on a specially formed sleeve on the speedometer instrument and on a specially formed stud on the transmission casing. It is obvious that the arrangement will be much more simple and economical and that the time required to make connections or to disconnect is reduced considerably.

Accordingly, it is an object of this invention to provide means whereby flexible shafting may be snapped on suitable receiving elements for operative engagement therewith.

It is another object of this invention to provide a snap-on coupling made of a material which will act as an insulator against noise transmitted to the speedometer by way of a flexible shaft casing. Another object of this invention is to provide an improved means for connecting the flexible shaft core to the speedometer drive shaft.

A feature of this invention is the use of noise insulating coupling means for both the core and the casing of a flexible shaft.

Other objects and features will be apparent upon a perusal of the following description in which.

Figure 1:
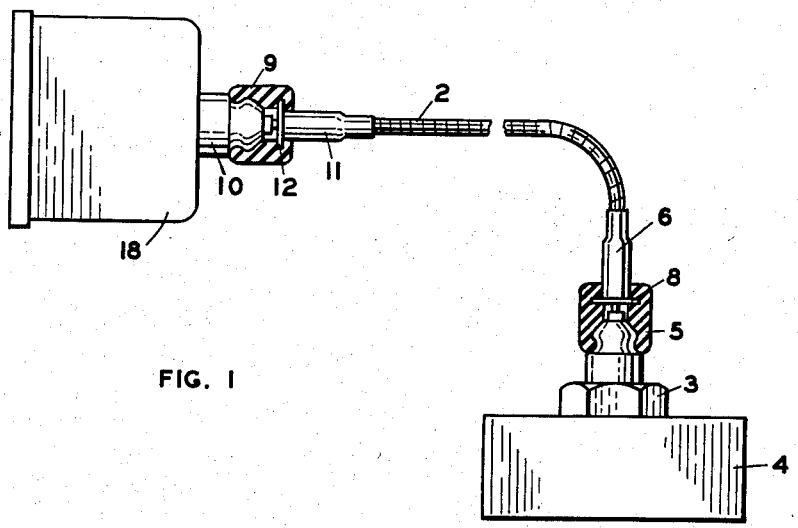
Fig. 1 shows diagrammatically a speedometer instrument and transmission casing of a vehicle together with a flexible driveshaft, partially in section, for interconnecting said instrument and transmission.

The core 1 of the flexible shaft 2 may be operatively connected to the transmission in any well known manner. A stud 3 having a hub-like top portion is screwed into the transmission casing 4, and a firm rubber coupling 5, having at one end thereof an annular recess conforming to the outer hub surface of stud 3, is snapped on the hub portion of stud 3. A ferrule 6, which is crimped on the casing 7 of the flexible shaft 2, is rigidly secured in an axial recess at the other end of coupling 5 by means of its flange 8 which is pressed into (or molded in) an annular groove in the central portion of coupling 5. A second rubber coupling 9, preferably similar to coupling 5, is snapped on a hub-like portion of a sleeve 10 of the speedometer instrument 18. A ferrule 11, preferably similar to ferrule 6, is crimped upon the casing 7 and a flange 12 on ferrule 11 is pressed into (or molded in) an annular groove in coupling 9.

It will be understood that, if ferrules 6 and 11 are merely pressed into couplings 5 and 9 respectively, a tight fit must be provided to prevent their disengagement. However, molding the rubber couplings on the ferrules assures a rigid engagement. It will also be understood that the firmness of the rubber in couplings 5 and 9 may be determined to satisfy the stress requirements of each particular application.

Figure 2:
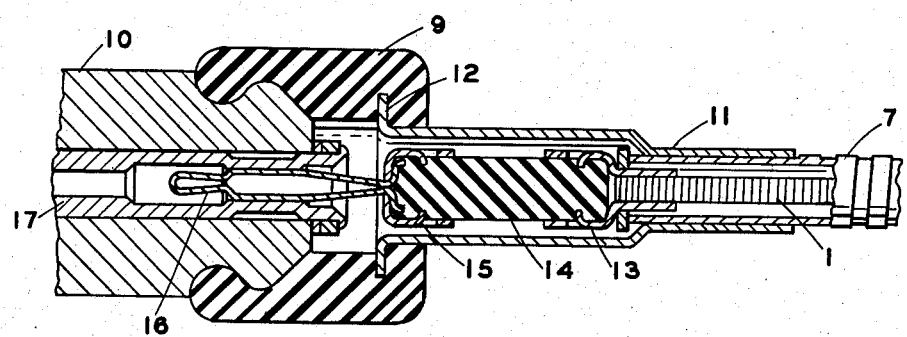
Fig. 2 shows an enlarged sectional view of the means for coupling the flexible shaft to the speedometer.
Figure 3:
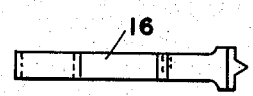
Fig. 3 shows a side view of the drive tip of the flexible shaft.

The improved means for connecting the core 1 to the speedometer shaft 17 will now be described. A ferrule 13 is crimped on core 1 of the flexible shaft 2 and is staked to one end of a cylindrical firm rubber cord 14. A cup-shaped member 15 is staked to the other end of rubber cord 14 and a drive tip 16 is held by said member 15 in operative engagement with rubber cord 14. The drive tip 16 also operatively engages shaft 17 of the speedometer 18 when coupling 9 is snapped on sleeve 10 as shown in Fig. 2. The purpose of rubber cord 14 is to effectively reduce noise transmitted from the metal core 1 to the speedometer instrument 18. As core 1 is rotated by the transmission in a well known manner, it rotates rubber cord 14 which in turn rotates drive tip 16 which rotates the shaft 17 to operate the speedometer 18. Obviously, any one of several speedometers well known in the art may be used.

It is also apparent that other well known resilient materials may be used to provide a snap-on coupling.

While there has been described what is at present believed to be the preferred embodiment of the invention, it will be understood that various modifications may be made therein; and it is contemplated to cover in the appended claims all such modifications as fall within the true spirit and scope of the invention.

What is claimed is:

1. For use with a speedometer which is driven by means of a flexible shaft comprising an outer casing and an inner core operatively connecting the speedometer to the transmission of a vehicle, a driveshaft sleeve secured to the speedometer and having an irregularly formed outer surface, a coupling of a material having the resilient, noise-absorbing characteristics of firm rubber firmly secured to the casing and having an irregularly formed internal recess complementary to the irregular sleeve surface for gripping engagement with said outer surface of the sleeve.

2. In combination a sleeve having a speedometer driveshaft rotatably mounted therein, a flexible shaft comprising a casing and a core adapted for operative engagement with the speedometer shaft, a vehicle transmission having a casing, a tubular stud on said casing adapted to receive said flexible shaft for operative engagement with the transmission, a substantially firm rubber coupling secured to one end of the flexible shaft casing and adapted to snap on said sleeve to hold said flexible shaft core in operative engagement with the speedometer shaft and a substantially firm rubber coupling secured to the other end of the flexible shaft casing and adapted to snap on said stud to hold the flexible shaft in operative engagement with the transmission.

3. For use with a combination in which a rotary device is driven by a remote prime mover by means of a flexible shaft comprising a casing and a rotatable core operatively connecting said prime mover with a drive shaft of said device, a drive shaft sleeve secured to said device and having an axially irregular outer periphery; a coupling member of a material having the resilient and noise absorbing characteristics of firm rubber, having an axial aperture therethrough to receive said core and having an irregular inner surface at one end thereof complementary to the irregular periphery of said sleeve for locking engagement therewith; and means firmly securing said coupling member to said casing.

4. For use with a combination in which a rotary device is driven by means of a flexible shaft comprising an outer casing and a rotatable inner core operatively connected to a drive shaft of said device, a drive shaft sleeve secured to said device and having an irregularly formed outer surface; a rigid element secured at one end to said casing and having an outwardly projecting flange at its other end; a generally tubular coupling means of a material having the resilient and noise-absorbing characteristics of firm rubber, having disposed toward one end thereof an internal annular groove adapted to receive and firmly hold the flange of said element and having adjacent the other end thereof an irregular inner surface complementary with said irregular sleeve surface for locking engagement therewith in a position in which the core operatively engages said drive shaft.

5. For use with a mechanism of the type in which a rotary device is driven by means of the flexible shaft including an outer casing and a rotatable inner core operatively connected to a drive shaft of said device, a firm cylindrical rubber cord; a ferrule rigidly secured at one end thereof to the core; an enlarged tubular portion at the other end of the ferrule having an inner peripheral surface substantially equal in diameter to the outer diameter of the cord for receiving one end of the cord, the tubular portion being staked to the cord; a drive tip having a pair of end projections forced into the other end of the cord to prevent relative rotational movement between the cord and drive tip; a cup-shaped retaining element having an aperture in its base for receiving the drive tip and having an annular side wall with an internal diameter substantially equal to the cord diameter for receiving the other end of the cord, the element being staked to the cord for permanently retaining the drive tip in operative engagement with the cord; a drive shaft sleeve secured to the rotary device and having an irregularly formed outer surface; a rigid element secured at one end to said casing and having an outwardly projecting flange at its other end; a generally tubular coupling element of a material having the resilient and noise-absorbing characteristics of firm rubber, having disposed toward one end thereof an internal annular groove adapted to receive and firmly hold the flange of said rigid element, and having adjacent the other end thereof an irregular inner surface complementary with said irregular sleeve surface for locking engagement therewith in a position in which the drive tip operatively engages said drive shaft.

References Cited in the file of this patent

UNITED STATES PATENTS

| | | |
|---|---|---|
| 1,250,364 | Selden | Dec. 18, 1917 |
| 1,984,347 | Sutton et al. | Dec. 11, 1934 |
| 2,047,340 | Uyeda | July 14, 1936 |
| 2,111,713 | Watson | Mar. 22, 1938 |
| 2,782,020 | McCandless | Feb. 19, 1957 |